United States Patent [19]
Dudley

[11] Patent Number: 5,168,692
[45] Date of Patent: Dec. 8, 1992

[54] NUT HARVESTING APPARATUS

[76] Inventor: James N. Dudley, 11484 Pine St., Jacksonville, Fla. 32258

[21] Appl. No.: 736,399

[22] Filed: Jul. 26, 1991

[51] Int. Cl.$^5$ ............................................. A01D 51/00
[52] U.S. Cl. ..................... 56/328.1; 414/440
[58] Field of Search ............... 56/328.1, 329, 362, 56/364, 400.02, 400.08, 400.11, 400.13, 400.14; 15/83; 414/438, 440

[56] References Cited

U.S. PATENT DOCUMENTS

| | | | |
|---|---|---|---|
| 2,539,596 | 1/1951 | Smith | 56/328.1 |
| 3,562,831 | 2/1971 | Kowalski | 5/83 X |
| 3,744,225 | 7/1973 | Reeves | 56/328.1 |
| 4,066,179 | 1/1978 | Livingston | 56/328.1 X |
| 4,480,349 | 11/1984 | Barr | 56/364 X |
| 4,593,519 | 6/1986 | Kimball | 56/328.1 |
| 5,025,620 | 6/1991 | Dudley | 56/328.1 |
| 5,070,684 | 12/1991 | Gancarz | 56/328.1 X |

Primary Examiner—George A. Suchfield
Attorney, Agent, or Firm—Arthur G. Yeager

[57] ABSTRACT

A rolling apparatus to be pushed or driven over ground where nuts have fallen, such apparatus rolling to pick up the nuts, and collect them in a basket. The apparatus includes a roller assembly of a plurality of wheel units each having a flexible wheel which contacts the ground and is spaced from the next adjacent wheel so as to clamp nuts between adjacent wheels and carry the clamped nuts around the roller assembly to a comb-like stripper which pries the nuts from the wheels and guides them into a collection basket. The basket is movable so that it may readily pass over ground objects, such as small rocks, pine cones and the like, as the apparatus is rolled over ground.

20 Claims, 4 Drawing Sheets

FIG I

NUT HARVESTING APPARATUS

BACKGROUND OF THE INVENTION

The task of harvesting nuts has always been a tiresome job since it requires picking up nuts from the ground under the nut trees. In general prior art attempts have been large cumbersome machines such as those disclosed in U.S. Pat. Nos. 2,679,133; 3,148,493; 4,364,222; 3,387,442; 3,475,889; 3,530,655; 3,579,969; and 3,591,948. My nut harvesting machine, described and claimed in U.S. Pat. No. 5,025,620, is an improvement over such prior art. My present invention is a modification employing a catcher basket with attendant benefits.

It is an object of this invention to provide a manually operable novel nut harvester. It is another object of this invention to provide a nut harvester that can be rolled over the ground to pick up nuts on the ground, and to deposit them in a collection basket. It is another object to provide a harvester for pecans that can be pushed over the ground like a lawn mower to pick up a large volume of nuts before discharging them for packaging and other processing. Still other objects will become apparent from the more detailed description which follows.

BRIEF SUMMARY OF THE INVENTION

This invention relates to a nut harvesting apparatus comprising a frame having a front, a back, and two sides, a lateral axle extending from one to the other of the sides, a plurality of ground engaging nut collecting wheels individually rotatably mounted side-by-side on an axle. The frame includes a collection basket having a front horizontal edge positioned immediately behind the nut collecting wheels for receiving harvested nuts therein. A nut stripping means removes nuts from the wheels and directs them into the basket. Each nut collecting wheel is a thin structure approximately the thickness of the largest diametrical dimension of the nuts being collected and having a radially outwardly projecting wall member having a radial height outwardly of the rim at least as large as the largest diametrical dimension of the nut and being adapted in combination with the wall member of the next adjacent wheel to clamp the nut therebetween. The stripping means is a comb-like member having a shaft extending across the upper back portion of the wheels and a plurality of separately pivotable comb teeth projecting downwardly from the shaft extending into the spaces between the projecting wall members on adjacent wheels to teeth tips positioned adjacent to the front horizontal edge of the collection basket. In specific and preferred embodiments a handle bar means at the back is used to push the apparatus; the wall member preferably is a row of spaced flexible spokes projecting radially outwardly from the rim; or alternatively the wall member is a solid thin, flexible wall extending radially outwardly from the rim. Preferably the flexible spokes made to be replaceable if broken by being formed in two telescoping portions that have a male-female connection means. In still another preferred embodiment there is included a dumping pivot extending forwardly of the wheels to permit the apparatus to be pivoted forwardly after the fashion of a wheelbarrow to empty the collection basket of nuts. The basket is movable upwardly so that it may pass over rocks and the like while the apparatus is being rolled over the ground.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The features of this invention are best understood by reference to the attached drawings.

Figure 1:
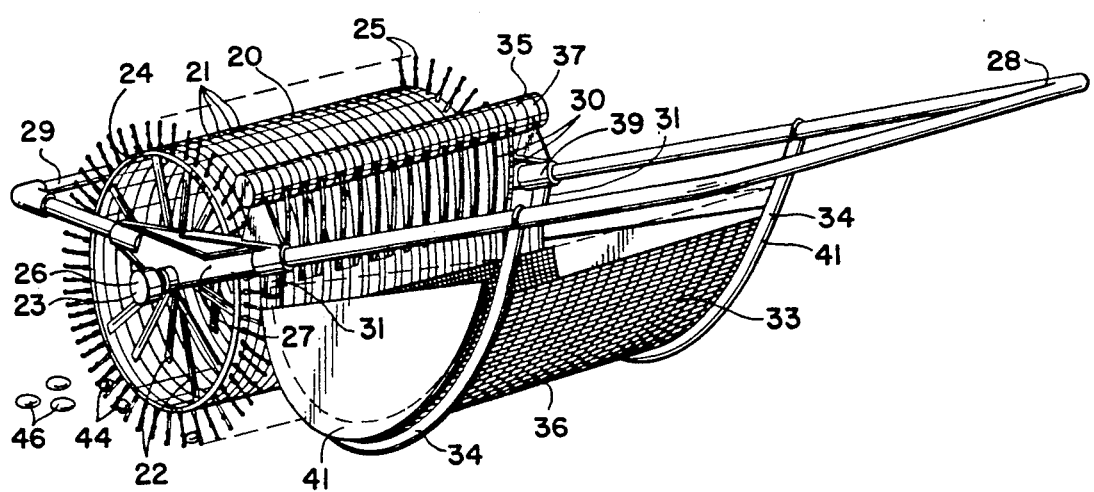
FIG. 1 is a perspective view of the nut harvesting apparatus of this invention.

In FIG. 1 there is shown the assembled nut harvester having a roller assembly 20, mounted on an axle 26 through a pair of journal members 27. Attached to the journal members 27 are a handle 28, a dumping pivot 29 and a nut stripper means 30. The apparatus is pushed from behind by a handle 28 which causes roller assembly 20 to roll over the ground picking up nuts 46 on the ground and which become caught in the roller assembly 20 as at 44, and remain in roller assembly 20 as it rolls forward until the nuts are contacted by teeth 38 of nut stripper 30 which pry the nuts loose and allow them to be released from roller assembly 20 and fall into open end top basket means 33. Handle 28 is shown as supporting two U-shaped tubes or rods 34 from which basket means 33 is hung. Solid end covers 41 complete the container of basket means 33 along with a wire mesh screen 36.

Figure 2:
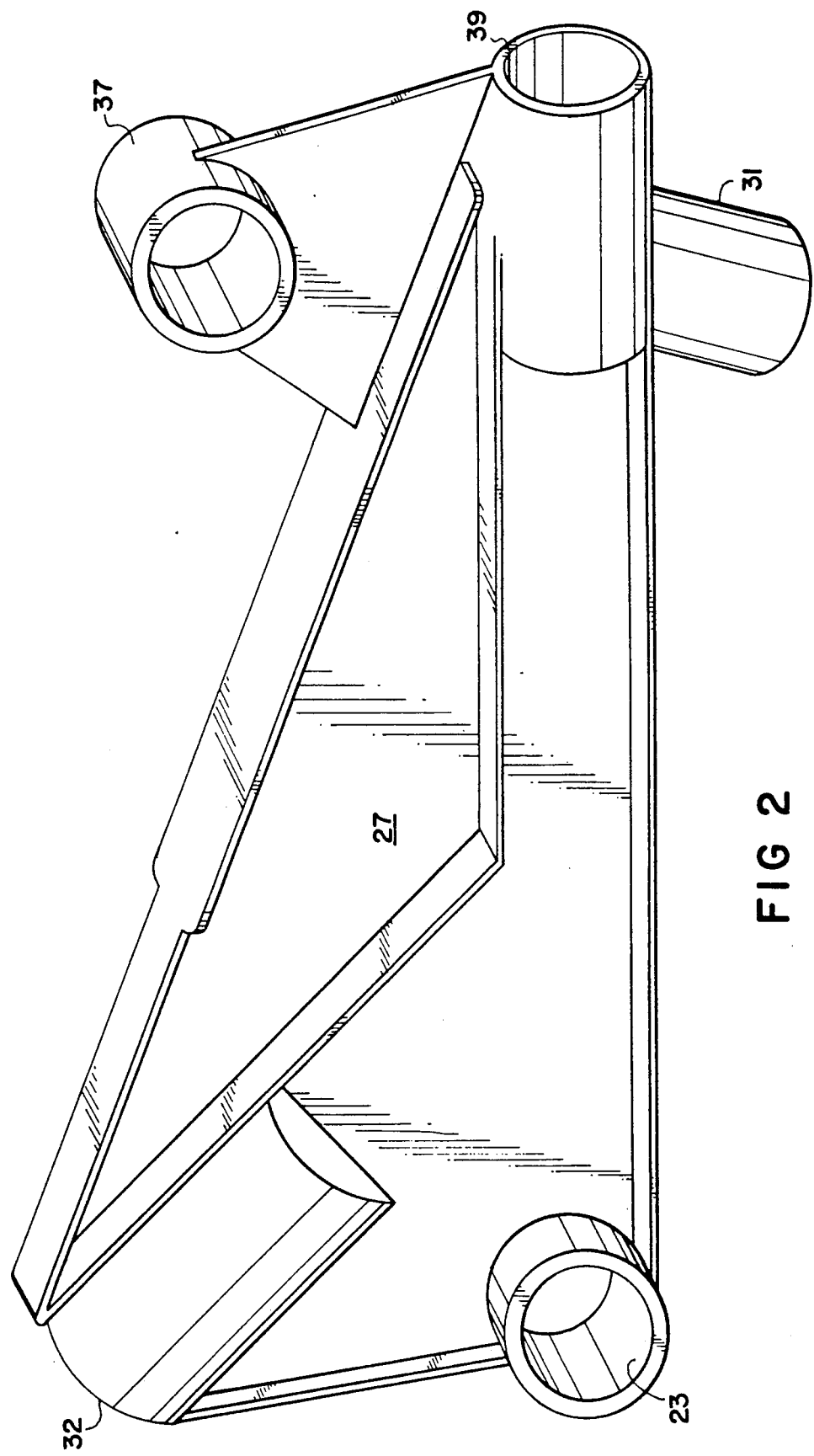
FIG. 2 is a perspective view of the journal member of this apparatus.
Figure 3:
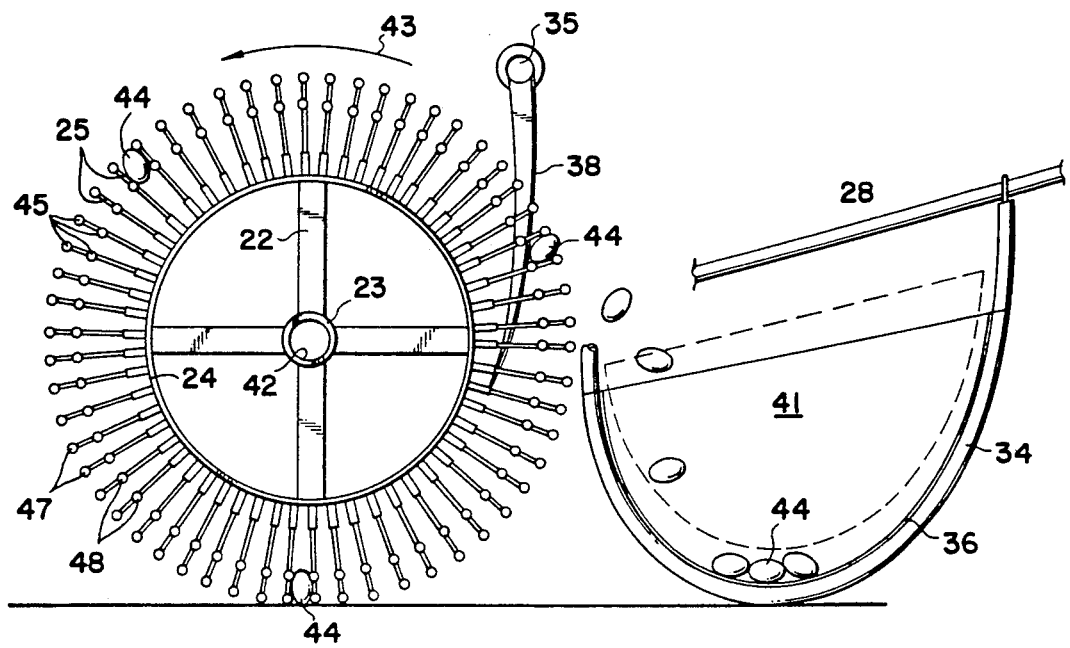
FIG. 3 is an end elevational view of the roller member, the nut stripper, and the collection basket of the apparatus of this invention.
Figure 4:
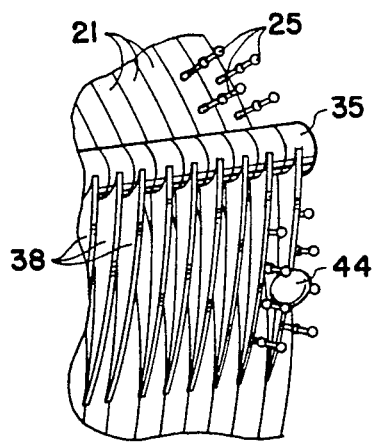
FIG. 4 is a perspective view of a portion of the apparatus showing the interaction of the nut, the nut strippers, and the roller member.
Figure 5:
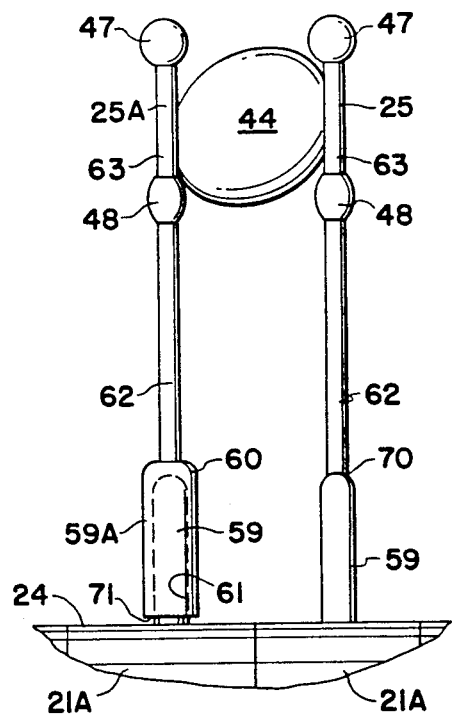
FIG. 5 is an enlarged elevational view of the spoke-like members on one embodiment of the wheel units of this invention.

In FIG. 2 there is shown one of journal members 27 which function as key support members for the entire harvester assembly. Two journal members 27 are needed for each apparatus in order to support other parts of the apparatus. An axle 26 is needed for roller assembly 20 and it passes through an opening in the form a socket in hub 23 of each journal member 27. Handle 28 fits into a recess or socket 39. Dumping pivot fits into recess or socket 32, and the forward end of basket support tube 34 fits into recess or socket 31. Roller assembly 20 comprises a plurality of thin wheel units 21 placed side-by-side contiguously on axle 26 and are able to rotate around axle 26 separately and independently from each other. Each wheel unit (as seen in FIG. 3) has an outer rim 24 and a central hub 23 connected by internal spokes 22, or alternatively, may be connected by a solid disc between rim 24 and hub 23. A central bore 42 in hub 23 forms a bearing for axle 26. Projecting outwardly from rim 24 is a flexible wall, which in the embodiment of FIGS. 1–5 is a circumferential row of spaced flexible spokes 25. The row of spokes 25 lie in a plane defined by the centerline of rim 24 and the center of the wheel unit 21A at the center of hub 23. FIG. 3 shows schematically how wheel 20 rolling in direction 43 toward pecans 46 on the ground picks up pecans 44 between adjacent spokes 25 and nut stripper 30 removing pecan 44 by teeth 38 and catching the pecans 40 in basket means 33.

The width of rim 24 is approximately the same as the smallest diametral dimension of the nuts being harvested. For pecans, which are oval in shape, this dimension would be the small overall dimension of the nut. For walnuts, which are approximately spherical, the dimension would be the diameter of the nut. It is, of course, to be understood that there is nothing critical in this definition because the spokes 25 are flexible and the wheel units 21 are not tightly pressed together. It is only necessary that the play between adjacent wheel units 21, the flexibility of spokes 25, and any other looseness in the structure be sufficient to allow nuts to be jammed between adjacent spokes 25 tightly enough to be restrained there until removed from the roller assembly 20 by the nut stripper means 30. If more pressure between adjacent wheel units is desirable bungee cords may be wrapped around internal spokes 22 of several of the wheel units 21 in a roller assembly 20. A desirable and preferred feature of spokes 25 is that shown in FIG. 3 where each spoke 25 has two radially spaced spherical knobs or beads 45 around the spoke. Outer knob 47 is at the tip of the spoke, and inner knob 48 is spaced inwardly from the tip by a distance about the size of the largest dimension of the nut. The actual dimensions of spokes 25 are not critical, but the overall length of each spoke 25 beyond rim 24 should be from about 1–3 times the maximum overall diametral dimension of the nuts being collected, and the distance between knobs 47 and 48 about one fifth of the length of spoke 25. Spokes 25 may be about 0.1 to about 0.25 inch in diameter and about 1–4 inches in length for most applications. Knobs 47 and 48 have diameters from about 1.1 to 1.25 times the diameter of spoke 25. Spokes are slightly flexible so as to accommodate various sizes of the nuts, but sufficiently stiff to be able to retain a nut between two or more adjacent spokes. Preferably spokes 25 are integral with rim 24. Each of the spokes 25 has a base portion 59 larger in diameter than shank portion 62 or tip portion 63 (see FIG. 5). Thus, portions 62 and 63 are more flexible than base portion 59 and if a spoke 25 becomes permanently bent or broken, usually it will be at the intersection 70 or thereabove. Rather than replacing an entire wheel unit 21, one may instantly repair defective spoke 25 with replacement spoke 25A by clipping off the defective spoke 25A at intersection 70 and positioning replacement spoke 25A with its recess 61 over base portion 59 and forcing spoke 25A toward axle 26 until intersection 70 engages the bottom of the recess 61, i.e., note that the bottom 71 of spoke 25A does not engage the rim 24. The fit between recess 61 and base portion 59 affords a friction lock and inhibits any easy or inadvertent removal thereof during use of the apparatus. The replacement spoke in all respects is identical to spoke 25 with respect to shank portion 62, tip portion 63 and knobs 47 and 48. The base portion 59A, in which recess 61 is located, by necessity is larger in diameter than base portion 59 since such base portion 59 tightly fits within recess 61.

Similarly dumping pivot 29 is shown as U-shaped tubing with the ends of the tubing slidable into recesses 32 of journal members 27. Dumping pivot 29 is merely a lateral rigid structure which can be pushed into the ground by raising handle 28 and continuing to raise handle 28 to dump nuts collected in basket means 33 in much the same way that a wheelbarrow is emptied.

Nut stripper means 30 is a large comb-like structure with a comb back shaft 35 and comb teeth 38 pointed downwards. Teeth 38 are pivotally attached to shaft 35 which, in turn, is seated in recesses 37 in journal member 27. Each tooth 38 is positioned between adjacent rows of spokes 25 on adjacent wheel units 21. The tapered shape of teeth 38 with tips resting on wheel rims at an inclined angle upward so as to force nuts clamped between adjacent rows of spokes 25 pries nuts 44 loose therefrom and allows them to fall freely into basket means 33.

Figure 6:
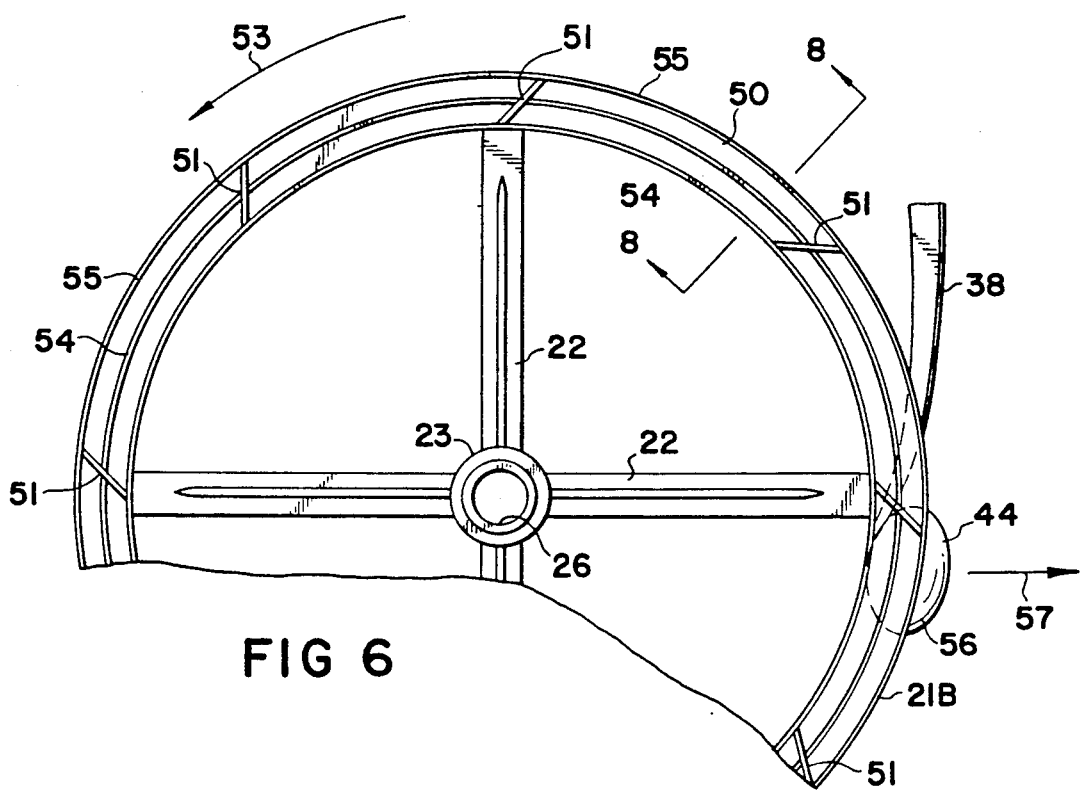
FIG. 6 is an end elevational view of a second embodiment of the wheel units of this invention.
Figure 7:
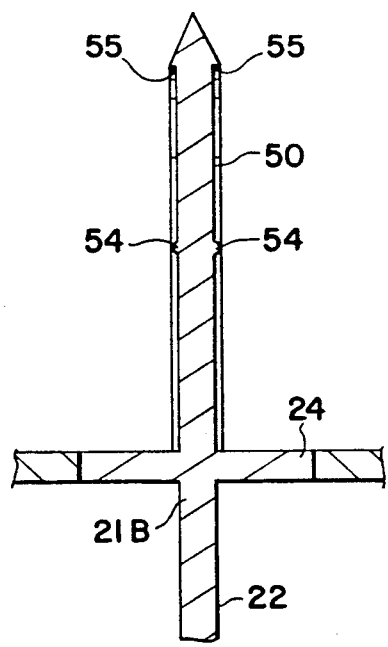
FIG. 7 is a front elevational view, partly in cross-section of the wheel units of the second embodiment of the invention.
Figure 8:
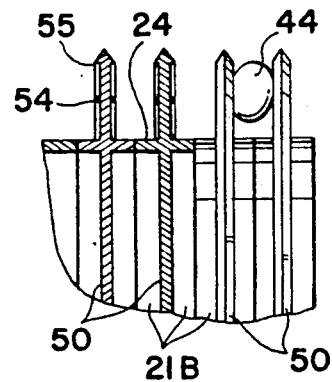
FIG. 8 is an enlarged cross-sectional view taken at 8—8 of FIG. 6.

Another embodiment of wheel unit 21 is shown in FIGS. 6–8. Wheel units in FIGS. 1–5 are labeled as 21A, while wheel units in FIGS. 6–8 are labeled 21B for purposes of distinction. The only distinguishing feature between units 21A and 21B is the structure of the upstanding wall member which contacts the nuts being collected. In wheel unit 21A the wall member is a row of spaced spokes 25 along the centerline of rim 24. In wheel units 21B (FIGS. 6–8) the wall member is a solid continuous thin wall 50 on the centerline of rim 24. Wall 50 is also slightly flexible as are spokes 25. Wall 50 has a small outer circumferential bead 55 extending outwardly on both sides of wall 50 at the outer edge of wall 50 and a small inner circumferential bead 54 extending outwardly on both sides of wall 50 about halfway between the outer edge of wall 50 and rim 24. There also are a plurality of spaced tangential beads 51 on both sides of wall 50 extending from rim 24 to the outer edge of wall 50. The direction of tangential beads 51 is such that as wheel unit 21B rotates in the direction of arrow 53 beads 51 will tend to guide nut 56 outwardly, toward the outer edge of wheel unit 21B in the direction of arrow 57 when contacted by teeth 36 of nut stripper 30.

It is to be understood that if the nut harvesting apparatus were to be pushed by a tractor, any suitable attachment would be acceptable, the wheels may be increased in diameter, and the roller lengthened without departing from the spirit or scope of the invention. Furthermore, roller units may be spaced in front of a tractor, i.e., the most forward being central, with two trailing roller units spaced rearwardly and on either side therefrom even beyond the wheel path of the tractor. Also, the roller units may be one in back of the other to improve the gathering of the nuts prior to being trampled by the tractor wheels or the like.

Preferably the entire harvester is made of polypropylene or polyvinylchloride (PVC), although it may be made of aluminum or other plastic materials. The harvester is easily dismantled into its various component parts for storage or repair.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A nut harvesting apparatus comprising a frame having a front, a back and two sides, a lateral axle extending from one to the other of said sides, a plurality of ground engaging nut collecting wheels individually rotatably mounted side-by-side on said axle, said frame including means for moving said apparatus along ground, a collection basket having a front horizontal edge positioned immediately behind said nut collecting wheels for receiving harvested nuts therein; and a nut stripping means to remove nuts from said wheels and direct them into said basket; each said nut collecting wheel having a rim and being a thin structure approximately the thickness of the smallest diametrical dimension of nuts being collected and including a radially outwardly projecting wall member having a radial height outwardly of said rim being at least as large as a largest diametrical dimension of a nut and being adapted in combination with the wall member of the next adjacent wheel to clamp a nut therebetween, said stripping means being a comb-like member having a shaft extending across the upper back portion of said wheels, and a plurality of separately pivotable comb teeth projecting downwardly from said shaft and extending into the spaces between said projecting wall members on adjacent wheels to teeth tips positioned adjacent to said front horizontal edge of said collection basket.

2. The apparatus of claim 1 wherein said wall member is a plurality of equally spaced spoke members extending radially outward of said rim to free ends, each said spoke member being substantially in a single plane passing through the center of said wheel and the circumferential center of said rim.

3. The apparatus of claim 2 wherein each said spoke member is flexible and has a pair of spaced circumferential shoulders slightly larger in diameter than the diameter of said spoke, one of said pair of shoulders being at the free end of said spoke and another of said pair of shoulders being spaced inwardly from said free end.

4. The apparatus of claim 3 wherein each said spoke member includes a base member integral with said rim and extension projection member having a shank portion and a tip portion, a replacement spoke member having an enlarged base member including an axial recess to fit tightly over said base member on said rim after removal of said shank and tip portions.

5. The apparatus of claim 1 wherein each said wheel is contiguous to the next adjacent wheel around the respective rims thereof.

6. The apparatus of claim 1 wherein said collection basket comprises a pair of parallel U-shaped tubular members projecting downwardly and rearwardly from said plurality of wheels and thence upwardly to said handle, and a coarse screen fastened to said tubular members to form an open-top basket having a horizontal front edge adjacent the outer perimeter of said nut collection wheels.

7. The apparatus of claim 6 wherein said basket is freely movable upwardly by ground debris to enhance free movement of said apparatus over ground.

8. The apparatus of claim 1 which additionally comprises a U-shaped dumping structure extending forwardly of said nut collection wheels to facilitate emptying nuts from said collection basket.

9. The apparatus of claim 1 wherein said frame includes a pair of journal members each having a first socket for receiving one end of said axle, a second socket for receiving one end of said handle bar means, a third socket for receiving one end of said dumping structure, and a fourth socket for receiving one end of said shaft of said nut stripping means.

10. The apparatus of claim 1 wherein said means for moving includes a handle bar means in the form of a U-shaped tubular member.

11. The apparatus of claim 1 wherein said wall member is a solid upstanding continuous wall lying in a plane through the center of said wheel and the circumferential center of said rim.

12. The apparatus of claim 11 wherein said continuous wall has two parallel sides, an outer free edge and an inner edge joining said rim, each side including a plurality of spaced linear beads projecting outwardly from said side in a direction tangential to said rim and extending from said inner edge to said outer edge and adapted to guide nuts clamped between adjacent walls from said inner edge to said outer edge.

13. A nut harvesting machine adapted to be rolled over ground, said device including a handle, a collection basket, an axle, a nut collecting roller assembly, a nut stripper means, and a dumping pivot; said roller assembly comprising a plurality of thin wheels each mounted contiguous to each adjacent wheel so as to rotate independently about said axle, said axle being mounted in a pair of journal members having corresponding recesses to receive and support said handle, said dumping pivot, and said nut stripper means; each said wheel having a hub to receive said axle, a tubular rim spaced radially outwardly of said hub, and a plurality of spokes extending outwardly of said rim for a distance which is at least as large as the largest diametral dimension of nuts being collected, said spokes being flexible with two radially spaced beads adjacent the end of each spoke and being positioned such that all of said spokes lie in a plane defined by the centerline of said rim and the center of said wheel hub; said nut stripper means being a comb-like device having a lateral shaft and a plurality of teeth mounted individually and pivotably on said shaft with said teeth extending generally downward to teeth tips lying against said wheel rims between spokes on adjacent wheels; said dumping pivot being a U-shaped tubular member extending from said journal members forwardly of and laterally across the front of said wheels, said handle being a U-shaped tubular member extending from said journal members upwardly and rearwardly of said roller member; said collection basket being supported from said handle and positioned adjacent to and rearwardly from said roller assembly and being adapted to receive nuts released from said spokes by said nut stripper teeth.

14. The machine of claim 13 wherein each of said handle and said dumping pivot are U-shaped tubular members with ends thereof which form a male/female coupling with corresponding recesses in said journal members.

15. The machine of claim 13 wherein each said wheel includes internal spokes joining said hub to said rim in a stable wheel structure.

16. The machine of claim 13 wherein the thickness of each said wheel rim approximates the smallest diametrical dimension of nuts being collected.

17. The machine of claim 13 wherein each said spoke outwardly of said rim includes a male base portion, a shank portion and an outer tip portion, said spoke being breakable between said shank and base portion, a replacement spoke carrying a female recess which fits over said male base portion axially to provide a single replaced said spoke;, said tip portion being flexible and having said circumferential beads at its free end, said female recess forming a friction locking fit to and around said male base member.

18. A nut harvesting apparatus comprising a frame and a handle mounted thereto for moving same, an axle mounted horizontally on said frame, a nut collecting roller assembly mounted on said axle, a nut stripper means positioned adjacent said roller member, a nut collection basket and a dumping pivot; said roller assembly including a plurality of thin wheels each mounted contiguous to each adjacent wheel so as to rotate independently about said axle, a collection basket hanging downwardly from said handle rearwardly of said roller assembly; each said wheel having a hub to receive said axle, a tubular rim spaced radially outwardly of said hub, and a plurality of ground engaging spokes extending outwardly of said rim for a distance which is at least as large as the largest diametral dimension of the nuts being collected, said spokes being flexible with radially spaced beads adjacent the outer ends of said spokes, all of said spokes lying in a plane defined by the centerline of said rim and the center of said wheel hub, said nut stripper means including lateral shaft and a plurality of separate teeth pivotable about said shaft and having free ends respectively located between said spokes on adjacent wheels with said free ends generally resting on said tubular rims of adjacent said wheels, said dumping pivot being a rigid U-shaped tubular structure projecting forwardly of said wheel assembly, a collection basket supported on said handle adjacently behind said wheel assembly to catch nuts released from said wheel assembly by said nut stripper means.

19. The apparatus of claim 18 wherein said basket is freely movable upwardly, by ground debris to enhance free movement of said apparatus over ground.

20. The apparatus of claim 18 wherein said basket is removably supported by said basket support.

* * * * *